W. J. CLAY.
REEL OPERATED HYDRANT.
APPLICATION FILED AUG. 31, 1908.

933,290.

Patented Sept. 7, 1909.
2 SHEETS—SHEET 1.

Witnesses

Inventor
W. J. Clay

W. J. CLAY.
REEL OPERATED HYDRANT.
APPLICATION FILED AUG. 31, 1908.
933,290.
Patented Sept. 7, 1909.
2 SHEETS—SHEET 2.
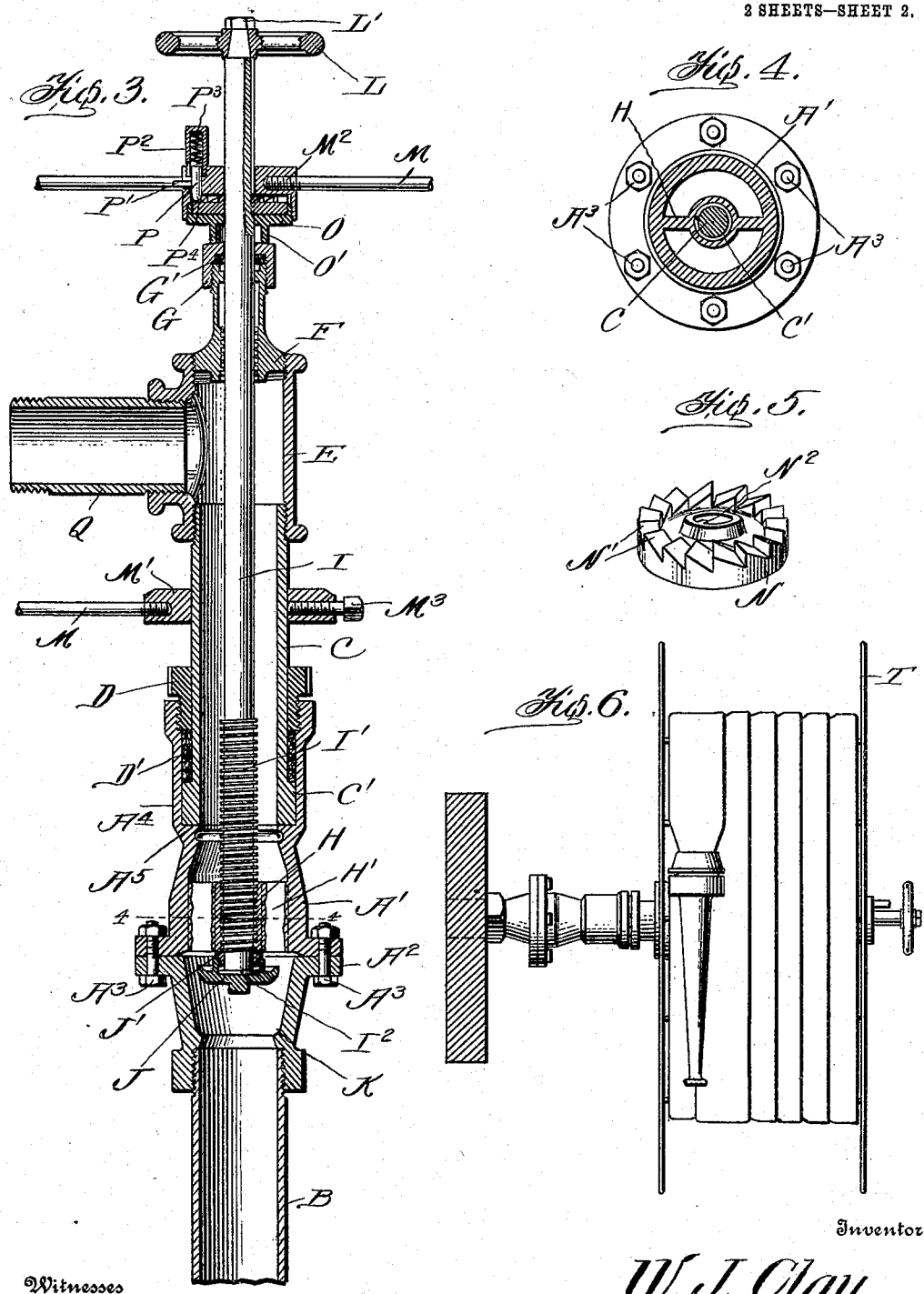
Witnesses
Inventor
W. J. Clay,
By O'Meara & Brock
Attorneys

UNITED STATES PATENT OFFICE.

WILIAM J. CLAY, OF COTTON VALLEY, LOUISIANA.

REEL-OPERATED HYDRANT.

933,290.   Specification of Letters Patent.   Patented Sept. 7, 1909.

Application filed August 31, 1908. Serial No. 451,009.

*To all whom it may concern:*

Be it known that I, WILIAM J. CLAY, a citizen of the United States, residing at Cotton Valley, in the parish of Webster and State of Louisiana, have invented a new and useful Improvement in Reel-Operated Hydrants, of which the following is a specification.

This invention relates to reel operated hydrants the object being to provide a reel in connection with a hydrant which will automatically open the valve when the reel is unwound.

A further object of the invention is to provide very novel means for operating the valve so that the hose carried by the reel can be readily wound upon the same without operating the valve.

A still further object of the invention is to provide very novel means for supporting the reel whereby it can rotate freely so as to allow the hose to be readily unwound quickly in case of fire.

A further object of the invention is to provide a hydrant and reel which are exceedingly simple and cheap in construction and one in which the parts are so arranged that they are not likely to get out of order in operation.

A further object of my invention is to provide a hydrant and reel which are so constructed that the valve of the hydrant can be operated independently of the reel whereby the valve can be closed by hand so that the hose can be quickly wound upon the same.

Another object of the invention is to provide the hub of the reel with a ratchet wheel which is keyed to the valve, the ratchet wheel being engaged by a spring actuated pin mounted in the hub so that the hub will be locked to the valve stem, when the reel is being unwound whereby the valve will be opened.

With these various objects in view, my invention consists in the novel features of construction hereinafter described, pointed out in the claims and shown in the accompanying drawings, in which—

Figure 1:
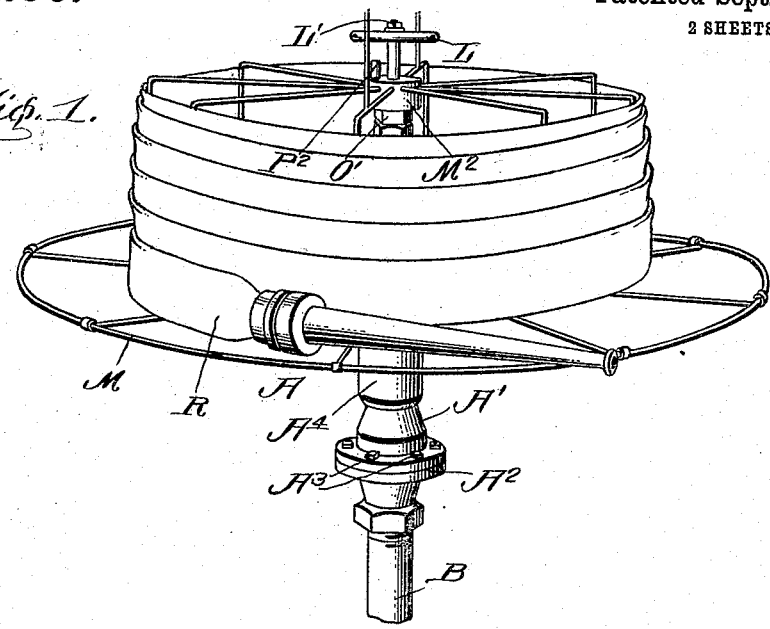
Figure 2:
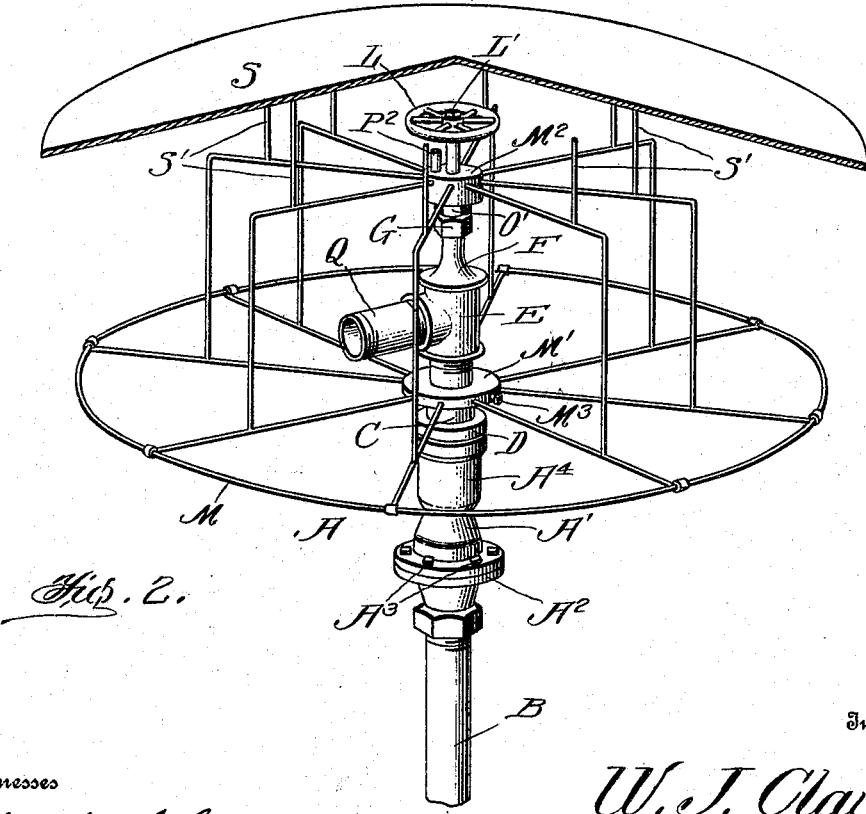

Figure 1 is a perspective view of my improved hydrant and reel, showing a hose arranged thereon. Fig. 2 is a perspective of the same showing the hose detached and a hood partly broken away supported by the reel for protecting the same when used out of doors. Fig. 3 is a vertical section. Fig. 4 is a section taken on the line 4—4 of Fig. 3. Fig. 5 is a perspective view of the ratchet wheel detached, and Fig. 6 is a side elevation of a hydrant constructed according to my invention showing it arranged in a horizontal position and a double flanged reel arranged thereon.

In carrying out my invention, I employ a valve casing A formed of upper and lower sections $A'$, $A^2$ secured together by bolts $A^3$ as clearly shown adapted to be secured on the end of a supply pipe B. The upper section $A'$ is provided with an upwardly extending portion $A^4$ cut away to form a shoulder $A^5$ on which is mounted the flanged lower end $C'$ of a tube C which is secured therein by a lock nut D and has packing $D'$ arranged between the end of the lock nut D and the flanged end $C'$ of the tube C so as to form a water tight joint and yet allow the tube to revolve freely therein as will be hereinafter fully described. Secured on the upper end of the tube C is a T, E, on the upper end of which is mounted a cap F which is provided with an externally threaded upper end over which is secured a nut G provided with a washer $G'$ forming a water tight joint so that all danger of water escaping is prevented as will be hereinafter fully described.

The upper section $A'$ of the valve casing is provided with an internally threaded sleeve H supported centrally therein by arms $H'$ through which is adapted to work the threaded lower end $I'$ of a valve stem I which has a valve J pivotally mounted on its lower end which is secured thereon by a lock nut $J'$ which engages a head $I^2$ formed on the lower end of the valve stem I so that the valve can freely turn on the same. The valve is adapted to engage a seat K formed in the lower section $A^2$ of the valve casing A so as to completely cut off the water supply from the pipe B. The valve stem extends up through the cap F and nut G, the washer $G'$ forming a water tight joint around the same so that water cannot escape and is provided with a longitudinal groove for the purpose hereinafter described. The upper end of the same is formed square having an externally threaded upper portion on which works a nut $L'$ for locking the hand wheel L of the squared portion so that the valve can be readily operated by hand so as to open and close the same when desired. A reel M provided with hubs M', M² is revolubly mounted on said hydrant, the hub M' being secured on the tube C by a set screw M³ and the hub M² being loosely mounted on the valve stem so that it can be turned freely thereon. The hub M² is hollow and mounted within the same is a disk N provided with a ratchet upper face N' and the bore of the same is provided with an inwardly projecting key N² adapted to fit within the longitudinal groove of the valve stem so that when the disk is rotated the stem will also be rotated as will be hereinafter fully described. The disk is secured within the hub by a nut O which is provided with a collar O' which normally rests on the upper face of the nut G so as to form a bearing for the same, the collar O' being provided with oppositely disposed lugs to enable the same to be readily grasped by a wrench. A threaded bore is formed in the top of the hub M² which communicates with a slot formed in the side through which extends the arm P' of a pin P which is slidably mounted within a hollow plug P² secured in the bore and arranged within the plug over the pin P is a coil spring P³ normally holding the beveled lower end P⁴ of the pin in engagement with the ratchet face of the disk so that when the wheel is turned in one direction, the pin will be locked into engagement with the teeth of the ratchet so as to cause the valve stem to turn which will open the valve. It will be seen that by placing the finger under the arm P' and lifting the same upwardly the pin will be raised out of engagement with the ratchet so as to allow the same to turn freely.

A pipe Q is secured in the T, E, to which the end of a hose R is adapted to be connected which is provided with an ordinary nozzle R' at its end and it will be seen that when the hose has been wound upon the reel as clearly shown in Fig. 1 and the hose is pulled on so as to cause the reel to unwind the stem will be rotated so as to cause the valve to be lifted out of its seat which will allow the water to pass up through the valve and up the pipe Q into the hose. By this arrangement the valve stem can be operated independently of the reel as when it is rotated in a reverse direction the pin will ride over the ratchet teeth so as to prevent the reel from being turned. It will be seen that in case of fire, it is only necessary to grab hold of the nozzle of the hose and run toward the fire with the same and by the time the end of the hose is reached, the valve will have been lifted out of its seat so as to allow a full supply of water to pass through the same and when it is desired to cut off the water supply, it is only necessary to turn the hand wheel L.

In Fig. 2, I have shown a hood S supported above the reel by arms S' so as to protect the same when used out of doors, the construction of the reel and hydrant being the same.

In Fig. 6 I have shown the valve casing secured to a horizontal supply pipe T and a double flanged reel U mounted thereon so that the device can be used in buildings against the wall where it is desired to save space, and it will be seen that the operation of the device is the same.

From the foregoing description, it will be seen that I have provided a reel operated hydrant which is so constructed that a positive movement is obtained of the valve stem when the reel is unwound so that it is almost impossible for the reel to be unwound without opening the valve. It will also be seen that if the pin is held out of engagement with the ratchet face, the reel can be turned independently of the valve stem.

Having thus fully described my invention, what I claim as new and desire to secure by Letters Patent, is:—

1. In a device of the kind described, the combination with a valve casing provided with a threaded sleeve, of a threaded valve stem mounted in said sleeve, a valve carried by the lower end of said stem, a tube revolubly mounted in the valve casing carrying an outlet pipe, a reel carried by said tube and means carried by the reel for revolving said valve stem when said reel is rotated.

2. In a device of the kind described, the combination with a valve casing, of a tube revolubly mounted in the casing, a reel fixed to the tube and means for locking said reel to the stem of the valve for the purpose described.

3. In a device of the kind described, the combination with a valve casing, of a valve stem mounted in said casing provided with a valve, a tube revolubly mounted within the casing carrying an outlet pipe, a reel fixed to the tube adapted to carry a hose which is connected to the outlet pipe and means carried by said reel for raising said valve when said reel is rotated by the unwinding of said hose.

4. The combination with a valve casing provided with a threaded sleeve, of a threaded valve stem mounted in said sleeve carrying a valve, a tube revolubly mounted within the casing, a reel secured to the tube, means carried by the reel for locking said reel to said valve stem and an outlet pipe carried by the tube to which a hose is adapted to be connected which is wound upon the reel whereby said valve stem will be rotated when the hose is unwound.

5. In a device of the kind described, the combination with a valve casing carrying a valve stem and valve, of a tube revolubly mounted in the casing, a T connected to said tube provided with an outlet pipe, a reel fixed to the tube adapted to support a hose which is connected to the outlet pipe and means for locking said reel to the valve stem when the reel is unwound by the hose.

6. In a device of the kind described, the combination with a valve casing carrying a threaded sleeve, of a threaded valve stem mounted in said sleeve carrying a valve, said stem being provided with a longitudinal groove, a tube revolubly mounted in the valve casing surrounding said valve stem, a T carried by the tube provided with an outlet pipe, a reel fixed to the tube, a ratchet carried by the reel provided with a lug fitting within the groove of the valve stem and spring actuated pin carried by the reel adapted to engage said ratchet for locking said ratchet and hub together.

7. In a device of the kind described, the combination with a valve casing provided with a threaded sleeve, of a threaded valve stem working in said sleeve having a valve pivotally mounted on its lower end, said stem being provided with a hand wheel, a tube revolubly mounted in the valve casing carrying an outlet pipe, a reel provided with a pair of hubs one of said hubs surrounding the valve stem and the other the tube, means for securing the hub to said tube, a ratchet carried by the other hub loosely keyed to the valve stem and a spring actuated pin carried by said hub engaging said ratchet, for the purpose described.

8. In a device of the kind described, the combination with a valve casing adapted to be connected to a supply pipe, of a valve stem mounted in said casing provided with a valve, said stem being provided with a longitudinal groove, a tube revolubly mounted in the casing provided with an outlet pipe, a reel secured to said tube, a ratchet loosely mounted in one of the hubs of the reel provided with a key fitting within the groove of the valve stem and a spring actuated plug carried by the hub of the reel engaging said ratchet for locking said hub and stem together, whereby said valve will be opened when said reel is rotated.

9. In a device of the kind described, the combination with a valve casing provided with a threaded sleeve, of a threaded valve stem working in said sleeve, a valve pivotally mounted on the end of said stem, a tube revolubly mounted in the casing having a T connected to its upper end provided with an outlet pipe, a cap inclosing the upper end of said T surrounding said valve stem, a packing nut secured on the end of said cap, a reel comprising a pair of hubs, one of said hubs being fixed to the tube and the other surrounding the valve stem, the last mentioned hub being hollow, a disk provided with a ratchet face loosely mounted within said hub and secured therein by a nut, said disk being provided with a key for securing it to the valve stem, and a spring actuated pin having a beveled lower end mounted in the hub engaging said ratchet face.

10. In a device of the kind described, the combination with a valve casing provided with a threaded sleeve and a valve seat at its lower end, a threaded valve stem working in said sleeve, a valve pivotally mounted on the lower end of said stem adapted to be seated in the valve seat of the casing, said valve casing being provided with an annular shoulder, a tube having a flanged lower end arranged within said casing on said shoulder, packing material arranged around said tube, a lock nut working in the casing for securing said tube and packing material within the casing, an outlet pipe carried by said tube, a reel fixed to said tube, a ratchet loosely mounted in one of the hubs of the reel keyed to said valve stem, and a spring actuated pin having a beveled lower end mounted in the hub of the reel engaging said ratchet.

11. In a device of the kind described, the combination with a valve casing, of a valve mounted in said casing provided with a longitudinally grooved valve stem, a tube revolubly mounted in the casing carrying an outlet pipe, a reel carried by said tube having a hub surrounding said valve stem, a disk provided with a ratchet face mounted within the hub surrounding the valve stem, said disk being provided with a key fitting within the groove of the valve stem, a nut for locking said disk within the hub, a threaded bore formed in said hub communicating with the slot formed in the side of the same and a pin arranged in said plug having a beveled lower end engaging the ratchet face of the disk, said pin being provided with an arm extending out through the slot of the hub and a spring arranged within the plug for holding said pin in engagement with the ratchet, for the purpose described.

WILIAM J. CLAY.

Witnesses:
J. E. HOLT,
J. H. CRINER.